United States Patent [19]

Mestler

[11] Patent Number: 4,566,661
[45] Date of Patent: Jan. 28, 1986

[54] FOLDING TABLE SUPPORT

[76] Inventor: Donald C. Mestler, 5 Potter Ct., Smithtown, N.Y. 11787

[21] Appl. No.: 636,306

[22] Filed: Jul. 31, 1984

[51] Int. Cl.$^4$ ............................................. F16M 11/38
[52] U.S. Cl. ................................. 248/171; 108/150; 248/188.7
[58] Field of Search .................. 248/558, 188.6, 188.7, 248/188.8, 188, 188.1, 158, 432, 166, 169, 171; 108/128, 150, 12, 19

[56] References Cited

U.S. PATENT DOCUMENTS

| | | | |
|---|---|---|---|
| 284,269 | 9/1883 | Bishop | 248/171 |
| 300,834 | 6/1884 | Barrie | 248/171 |
| 2,238,708 | 4/1941 | Russell . | |
| 3,064,932 | 11/1962 | Holderman | 248/171 |
| 3,232,584 | 2/1966 | Miles | 248/166 X |
| 3,391,660 | 7/1968 | Stewart . | |
| 3,473,771 | 10/1969 | Newman . | |
| 3,738,699 | 6/1973 | Fain . | |
| 3,838,838 | 10/1974 | Seaman, Jr. . | |
| 4,061,302 | 12/1977 | Boone . | |
| 4,074,881 | 2/1978 | Bickford . | |
| 4,223,860 | 9/1980 | Prest . | |

*Primary Examiner*—J. Franklin Foss
*Assistant Examiner*—David L. Talbott
*Attorney, Agent, or Firm*—Brumbaugh, Graves, Donohue & Raymond

[57] ABSTRACT

A support assembly, for use with a table assembly for a recreational vehicle includes at least three support legs which pivots on a support collar which slides along a central support tube for the table. The outward pivoting motion of the legs is limited by struts which are pivotably mounted between the central support tube and each of the legs.

12 Claims, 5 Drawing Figures

_4,566,661_

FOLDING TABLE SUPPORT

BACKGROUND OF THE INVENTION

This invention relates to support apparatus for use with tables, particularly for use with tables ordinarily used in vans, campers and similar recreational vehicles.

U.S. Pat. No. 4,223,860 discloses a tripod-type table support for a vehicle table, which includes folding table supporting legs and support struts mounted to the central table support tube. In the operative position the support struts are in compression when supporting the table. The arrangement of the prior art support apparatus requires struts of relatively rugged, and therefore heavy, construction.

Another disadvantage of the prior folding support apparatus as described in the aforesaid patent is that in order to fold the table legs it is necessary that the legs move in an outward direction from the central tubular leg support. This makes folding of the leg structure difficult when the structure is within the small confines of a van or camper.

It is an object of the present invention to provide a new and improved table support apparatus for supporting a van or camper table for use outside the vehicle.

It is a further object of the present invention to provide such a folding table support apparatus wherein the table legs move inwardly toward the central support during the folding operation, so that the folding operation can be achieved in a relatively confined space.

SUMMARY OF THE INVENTION

In accordance with the present invention there is provided a support apparatus for use with a table arrangement which includes a table-top having a tapered receiving socket mounted on one side and a cylindrical table support tube having tapered ends for insertion into the table-top socket and another socket. The apparatus includes a cylindrical collar having an axis and a central axial bore arranged to surround the tube. The collar has means for engaging the tube to selectively axially fixed the collar on the tube. At least three support legs extend radially from the collar and are pivotably mounted thereto by pivot axes which are circumferential with respect to the collar axis. At least three support struts are provided and arranged for pivotal connection to the tube and to the legs at a selected position between the collar and the radial outer end of the legs, for limiting the outward pivoting movement of the legs.

In a preferred embodiment of the invention each of the legs is mounted to the collar to pivot in a plane which is tangential to the tube. The struts are arranged to engage radial holes in the tube in each of the tangential planes and to pivot about the holes in the tangential plane. The collar is preferably constructed using an outer collar structure member and an inner collar member for slidably engaging the tube. In one arrangement, each of the legs is formed of substantially perpendicular first and second leg portions, wherein the first leg portion extends along the pivot axis and the second leg portion pivots in the tangential plane. Each of the struts is preferably arranged to extend a radial distance from the tube which is less than the distance between the pivot axis and the selected position on the leg to which the strut is mounted. Each of the struts preferably has a strut length between the pivotable connections which is greater than the distance between the selected position on the leg and the radial outer end of the leg.

In accordance with the invention there is provided a dual purpose table support which includes the support apparatus mounted to a cylindrical table support tube.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
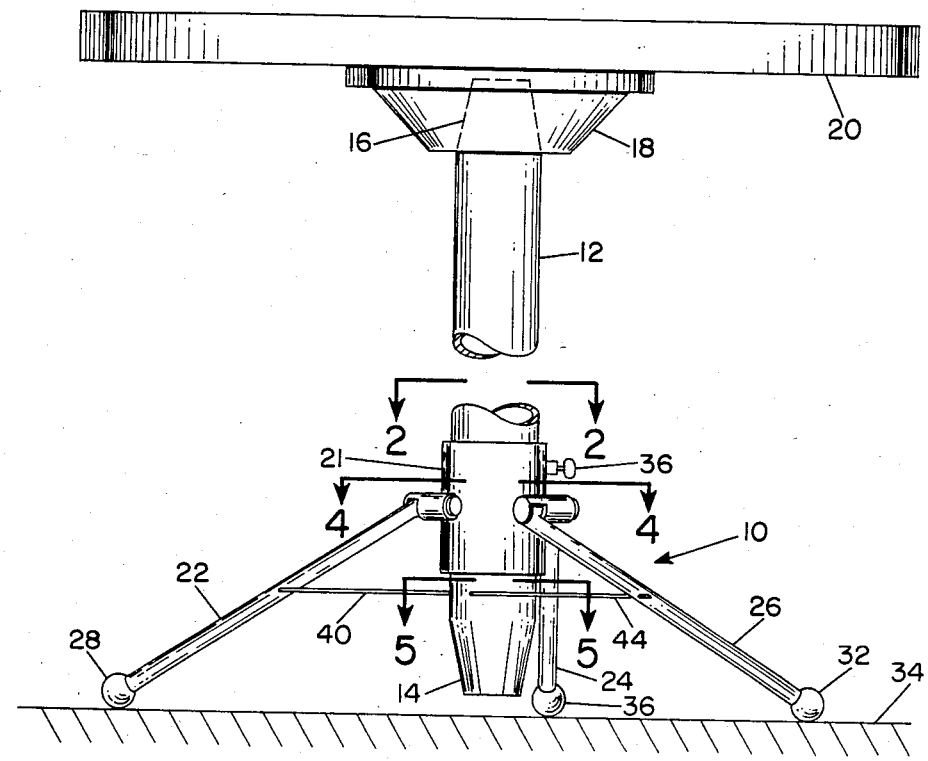
FIG. 1 is a plan elevation view of a table with a support apparatus in accordance with the present invention.
Figure 2:
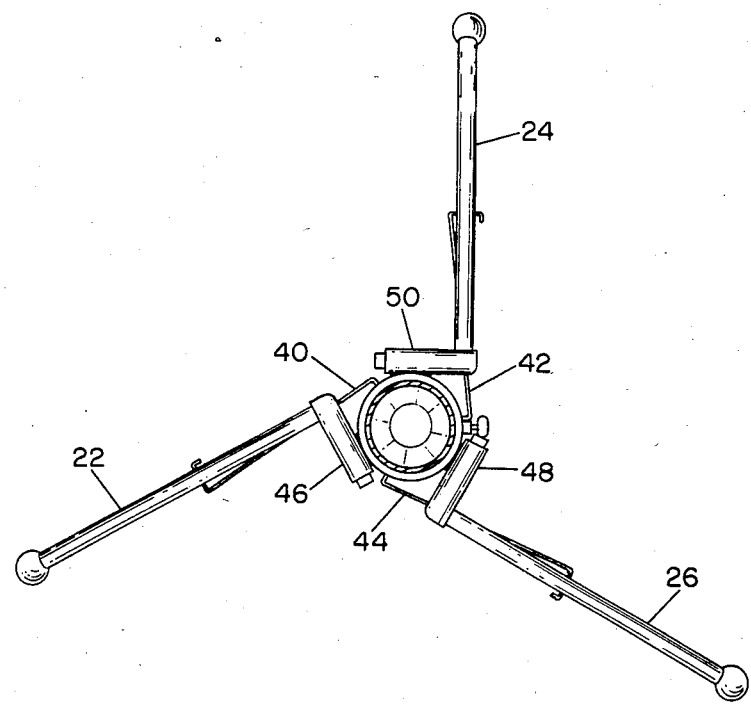
FIG. 2 is a cross-sectional view of the table of FIG. 1.
Figure 3:
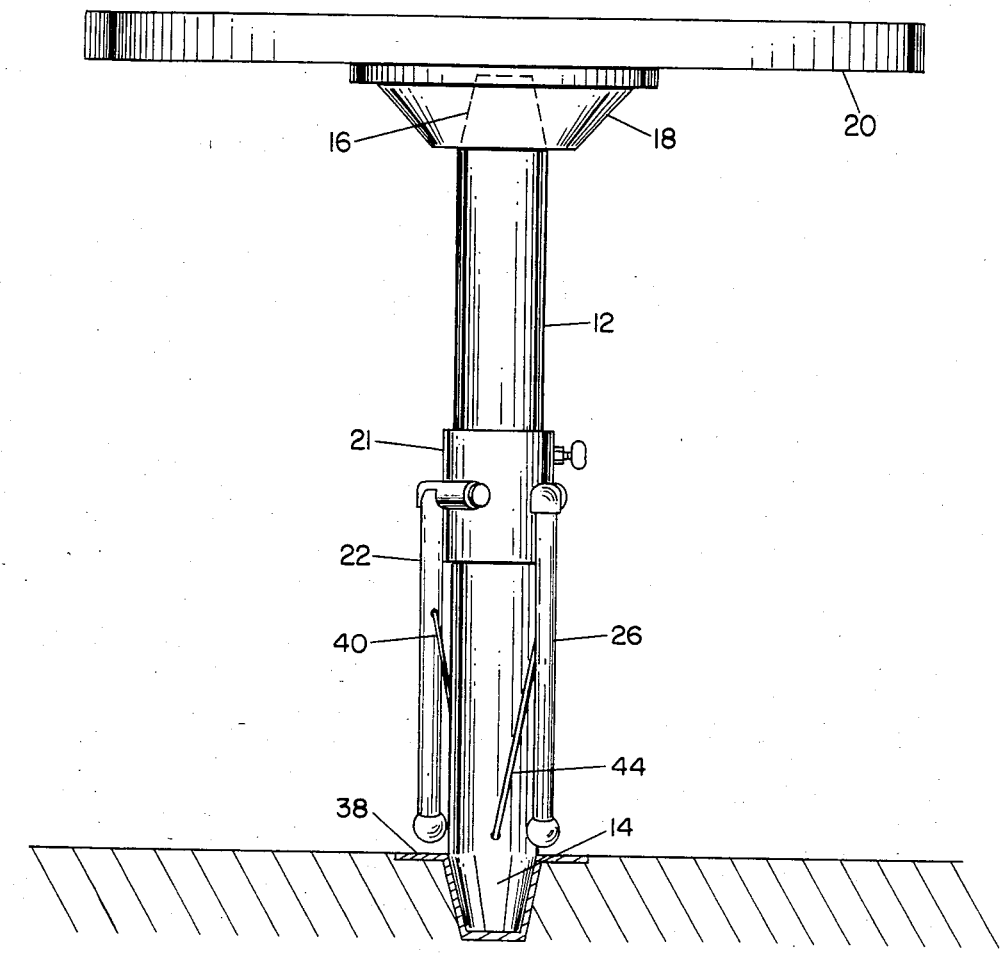
FIG. 3 is a plan elevation view of the support apparatus of FIG. 1 in a folded configuration.

In FIGS. 1 and 2 there is shown a table support apparatus in accordance with the present invention being used with a table for a van or other recreational vehicle. The support apparatus 10 is mounted to a central support tube 12 which is provided with tapered ends 14 and 16. Ends 14 and 16 are adapted to be inserted into correspondingly tapered receiving sockets, such as socket 18 which is mounted to the bottom of table-top 20. Tapered end 14 may also be inserted into a similar socket mounted to the floor of a van, or into a recessed socket in the floor of a van with the support apparatus 10 in a folded position as shown in FIG. 3.

The support apparatus 10 includes a support collar, which is adapted to surround central support tube 12 and to slide thereon. Three legs 22, 24 and 26 are pivotably mounted to support collar 21 and arranged to pivot on pivot axes which are circumferentially arranged at equal angles around the support collar, as may be more easily seen in FIG. 2. Each of legs 22, 24 and 26 is provided with a rubber tip 28, 30, 32, to prevent damage to a floor 34 or similar surface on which the table is supported.

Collar 21 is provided with a set screw 36 for engaging tube 12 to axially fix the collar on the tube.

As shown in FIG. 1, legs 22, 24 and 26 are limited in their pivotal movement by support struts 40, 42 and 44 which are pivotably mounted to legs 22, 24 and 26 and pivotably mounted to central support tube 12, as will be further described.

Figure 4:
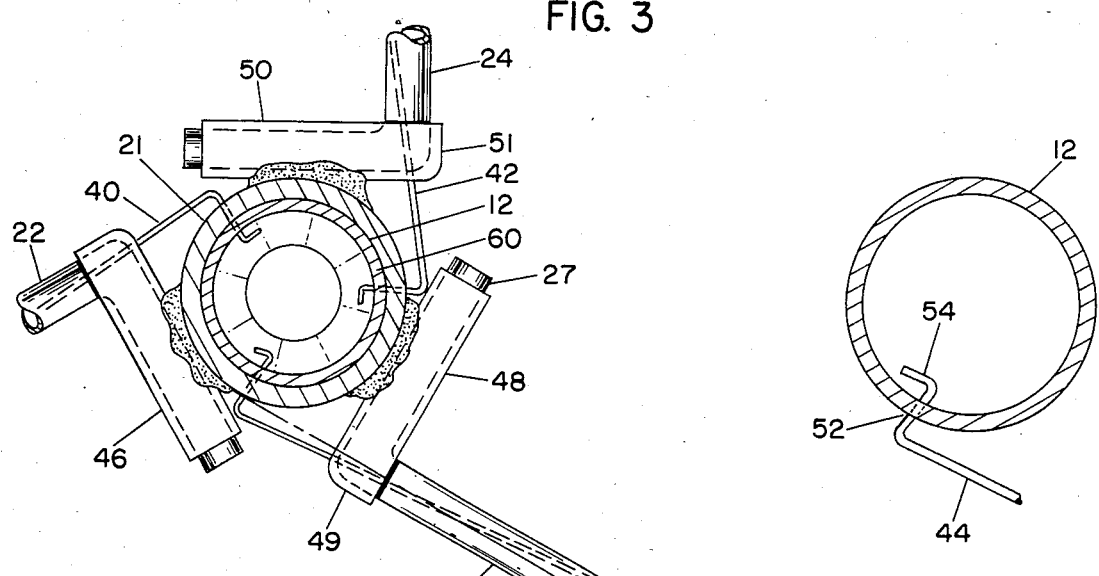
FIG. 4 is a cross-sectional view of the FIG. 1 support apparatus.

FIG. 4 is an enlarged cross-sectional view showing the arrangement of legs 22, 24 and 26 and support struts 40, 42 and 44. In the illustrated embodiment, each of the legs 22, 24 and 26 is constructed of hollow galvanized steel tubing, such as 0.5 inch inner diameter, 0.7 inch outer diameter conduit tubing. The legs are formed of two sections of tubing joined at a right angle, for example by welding, to form an L-shaped member, which has a first portion 27 along the pivot axis for the leg and a second portion 29 which extends outward from the collar 21 to form the main support member for the legs.

In the embodiment illustrated in FIGS. 1 through 5, the first portion 27 of leg 26 extends within tubular bearing 48 and the second portion 29 extends perpendicular to first portion 27 and has a center line 58 which is tangential to support tube 12. First portion 27 rotates in bearing 48 so that second portion 29 pivots within a plane which is tangential to tube 12. Bearing 48 is tubular in shape and is welded to collar 21 as illustrated. Bearing 48 may be formed by splitting lengthwise a section of conduit tubing, expanding the tubing along the split and welding the two sides of the split to collar 21. The end 49 of bearing 48 is excess tubular material which is rolled over to enclose the end of first leg portion 27 so that leg portion 27 is held within bearing 48. An open portion of bearing 48 is provided to enable leg 29 to pivot.

As an alternate to the embodiment illustrated in FIG. 4, it is possible to roll over or otherwise enlarge the end of leg portion 27 which is away from leg portion 29, so that it is trapped within bearing 48. In this case bearing 48 can be a simple tubular member.

Figure 5:
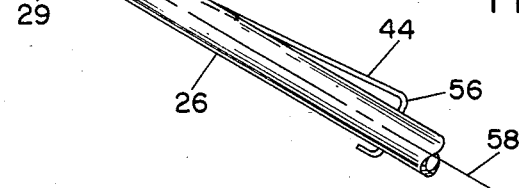
FIG. 5 is a cross-sectional view of a portion of the FIG. 1 support apparatus.

As previously mentioned each of the legs 22, 24, 26 pivots within a plane which is tangential to tubular support 12. This offset pivoting of the legs provides the basis for a simplified arrangement for mounting of leg supporting struts 40, 42, 44. Each of the support struts 40, 42, 44 is mounted in a manner similar to strut 44, which is illustrated in detail in FIGS. 4 and 5. Strut 44 is bent at the end 54 in a offset S-shaped configuration and passed through a radial bore 52 in tube 12 as illustrated in FIG. 5. FIG. 5 is simplified in that only one strut 44 is shown, but those skilled in the art will recognize that three struts are inserted in radial bores such as bore 52 at equal angular spacing around tube 12 at the same axial position. The particular bend configuration illustrated in FIG. 5, herein called an offset S-shaped bend, enables insertion of strut 44 when it is not attached to leg 26 by angular manipulation of the strut. Once inserted the tip of the S-shaped bend resists removal of the strut by reason of tension forces exerted on the strut by the leg during folding or unfolding of the support apparatus. As inserted, the strut has a high tensile strength for forces exerted by the leg in connection with support of the tube 12 and table-top 20. After insertion of the strut end 54 as shown in FIG. 5 into central support tube 12, the opposite end 56 of strut 44, which has an initial right angle bend, is inserted through a bore in leg 26 and bent around at the end to be retained in the leg.

As noted with reference to FIG. 4, bore 52 in tube 12 which receives end 54 of strut 44 is located at an angular position on tube 12 which corresponds to the intersection of the plane within which leg 26 pivots with the tube 12. This provides the direction of tension forces caused by support of table top 20 from leg 26 directly along the length of strut 44. Strut 44 is conveniently made of welding rod which is compact and lightweight and can be bent and retained in the appropriate configuration with adequate tensile strength for supporting legs 22, 24 and 26.

In the embodiment illustrated leg portion 29 extends approximately 11 inches outward from the bearing formed by tube 48. Accordingly, the total length of the leg from the collar 21 is approximately 12 inches. Strut 44 has a length of approximately 8 inches from the point where it passes through bore 52 in tube 12 to the point 56 where it is bent and passes through the bore in leg portion 28. The strut length is selected to be greater than the length from the bore in leg 26 at bend 56 to the outer end of leg 26. The length of strut 44 is also selected so that strut 44 will limit the outward pivoting of leg 26 as shown in FIG. 1. Accordingly, the length of strut 44 from bearing 48 to bend 56 is less than the length of leg portion 29 from bearing 48 to point 56.

FIG. 3 illustrates the support apparatus of the present invention in the folded position. This folded position is reached by loosening set screw 36 and drawing collar 21 directly upward along center tube 12. During this folding motion the action of struts 40, 42, 44 on legs 22, 24, 26 is such that the leg tips 28, 30, 32 are lifted in an upward axial direction with respect to tube 12 at the same time as they are drawn inward. This folding motion results from the position and length of struts 40, 42, 44. Accordingly, the legs are completely out of the way of the tube end 14 which can be inserted into a socket 38. Also, where the socket 38 is surface mounted and protrudes upwardly from the horizontal surface to which it is mounted, it is in some cases possible to fold and unfold the support assembly 10 while the tapered end 14 is inserted into a support socket. The folding action of legs 22, 24, 26 being entirely in an inward moving direction has distinct advantages in the close confines of a van or similar vehicle, in that it is not necessary to have excess space to allow the legs to pivot about as they fold.

Collar 21 of the support apparatus illustrated is provided with an outer, preferably steel, support portion to which bearings 46, 48 and 50 are mounted. This portion is provided with a lining 60, visible in the cross-sectional view of FIG. 4, which is preferably a soft, low friction material, such as cork or plastic. This material provides smooth motion of collar 21 as it is drawn along tube 12 for purposes of folding, and also prevents scratching or other damage to the chrome finish which is usually provided on support tube 12.

While there has been described what is believed to be the preferred embodiment of the present invention, those skilled in the art will recognize that other and further modifications may be made thereto without departing from the spirit of the invention, and it is intended to claim all such changes and modifications as fall within the true scope of the invention.

I claim:

1. Support apparatus for use with a table arrangement including a table-top having a tapered receiving socket mounted on one side and a cylindrical table support tube having tapered ends for insertion into said table-top socket and another socket, comprising a cylindrical collar having an axis and a central axial bore arranged to surround said tube, said collar having means for engaging said tube to selectively axially fix said collar on said tube, at least three support legs, extending radially from said collar and pivotably mounted thereto by pivot axes which are circumferential with respect to said collar axis to fold in planes which are tangential to said tubes, and at least three support struts arranged for pivotal connection to said tube and to said legs at a selected position between said collar and the radially outer ends of said legs for limiting the outward pivoting of said legs.

2. Support apparatus as specified in claim 1 wherein said struts are arranged to engage radial holes in said tube arranged in each of said tangential planes and to pivot about said holes in said plane.

3. Support apparatus as specified in claim 2 wherein said struts have offset S-shaped curves formed to engage said radial holes.

4. Support apparatus as specified in claim 1 wherein said collar further includes an outer collar structural member and an inner collar member for slidably engaging said tube.

5. Support apparatus as specified in claim 1 wherein each of said legs is formed of substantially perpendicular first and second leg portions, wherein said first leg portion extends along said pivot axis and said second leg portion pivots in said tangential plane.

6. Support apparatus as specified in claim 1 wherein each of said struts extends a radial distance from said pivot axis which is less than the length of said leg between said pivot axis and said selected position.

7. Support apparatus as specified in claim 6 wherein each of said struts has a strut length between said pivotal connections which is greater than the distance between said selected position and the radially outer end of said leg.

8. A dual purpose table support comprising a cylindrical table support tube having a first tapered end for insertion into a tapered receiving socket on the underside of a table top and a second tapered end for insertion into a floor mounted socket and a retractable table support leg assembly comprising a cylindrical collar arranged to slide along said tube and having engagement means for fixing said collar axially on said tube, at least three legs mounted to said collar and pivotable between a first position substantially parallel to said tube and a second position extending radially from said tube and axially from said collar, and at least three struts, one for each of said legs, said struts being pivotably mounted to said tube at a position between said collar and said second end, said position being spaced from said second end by a distance greater than the axial length of said floor mounted bracket, and said struts being pivotably mounted to said legs, thereby to limit the pivoting of said legs in said second position, the length of said legs and struts and the location of said pivots being selected to cause said legs to extend axially beyond said second tube end in said second position to support said tube on a horizontal surface and to cause said legs to be spaced from said second tube end by a distance which exceeds said axial length of said floor mounted socket in said first position wherein each of said legs are formed of substantial perpendicular first and second leg portions, wherein said first leg portions extends along an axis for pivoting of said leg and wherein said second leg portion pivots in a plane substantially tangent to said tube.

9. A table support as specified in claim 8 wherein said struts are pivotably mounted to said tubes along the intersection of said tangential plane and said tube.

10. A table support as specified in claim 9 wherein said struts are pivotably mounted to said second leg portions on the same side as said first leg portions.

11. A table support as specified in claim 10 wherein said struts comprise rods which pass through and pivot in radial holes in said tube at said intersection and which pass through and pivot in radial holes in said second leg portion parallel to said first leg portion.

12. A table support as specified in claim 8 wherein said collar includes an outer collar structural member and an inner collar member for slidably engaging said tube.

* * * * *